Figure 23:
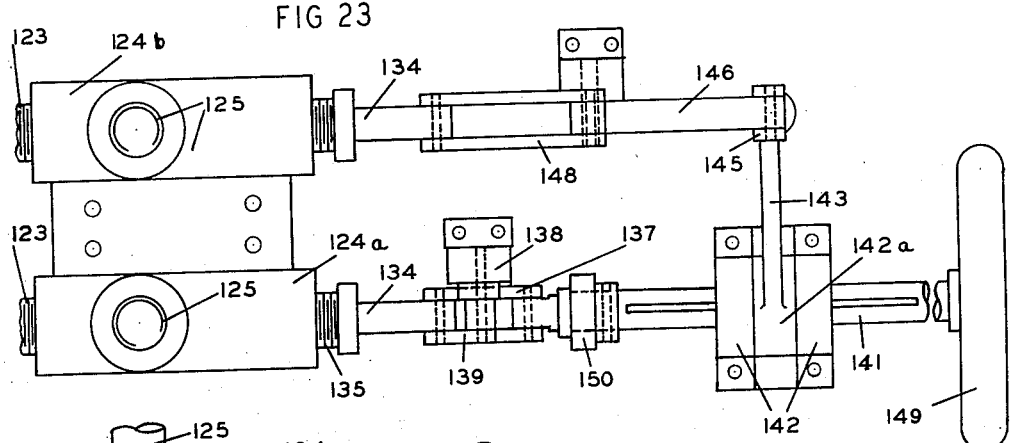

May 22, 1951     E. T. TURNER     2,553,952
SELF-PROPELLED VEHICLE
Filed Dec. 20, 1945     12 Sheets-Sheet 1
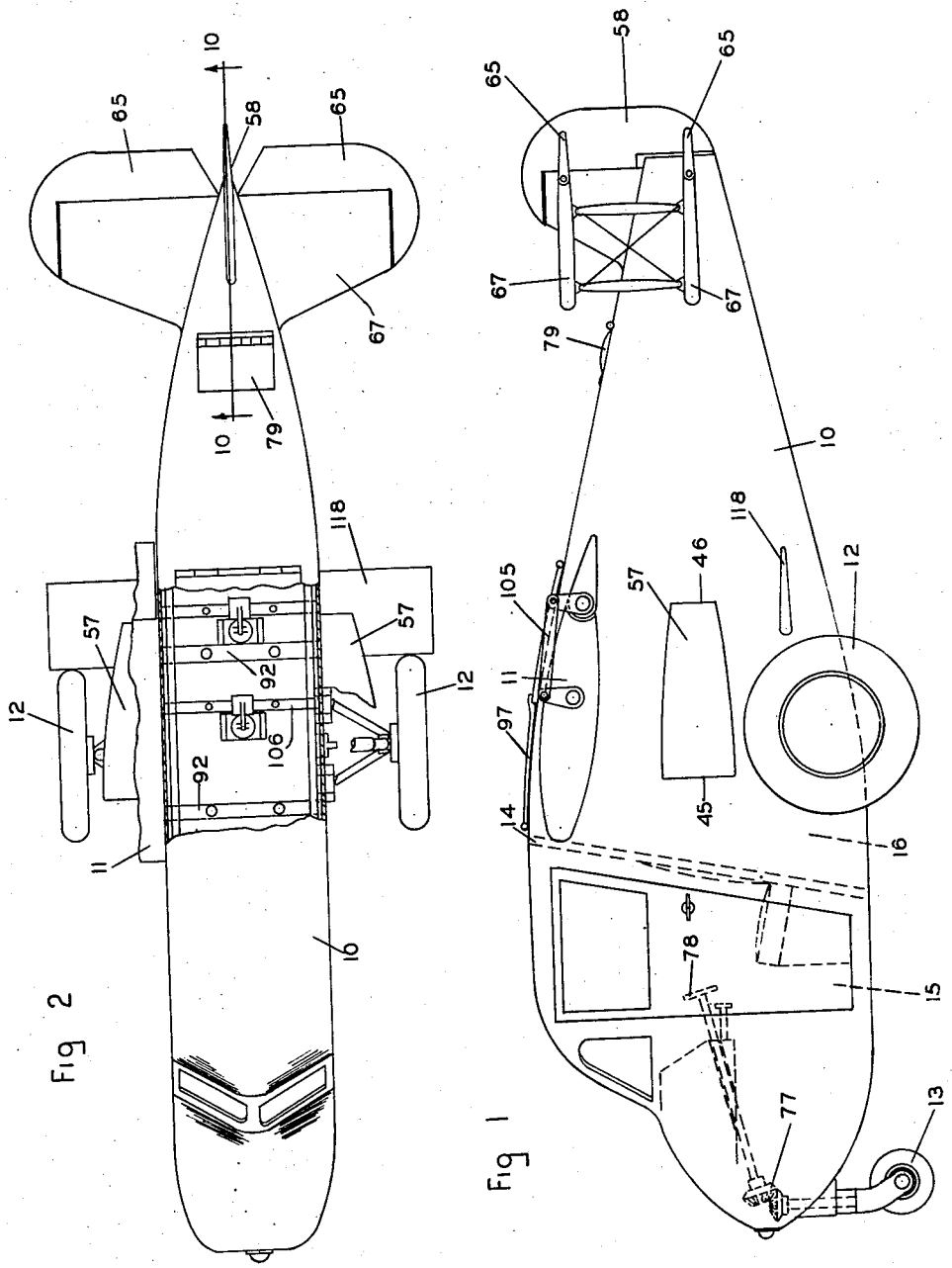
INVENTOR.
EDWARD T. TURNER
BY May 22, 1951     E. T. TURNER     2,553,952
SELF-PROPELLED VEHICLE
Filed Dec. 20, 1945     12 Sheets-Sheet 2
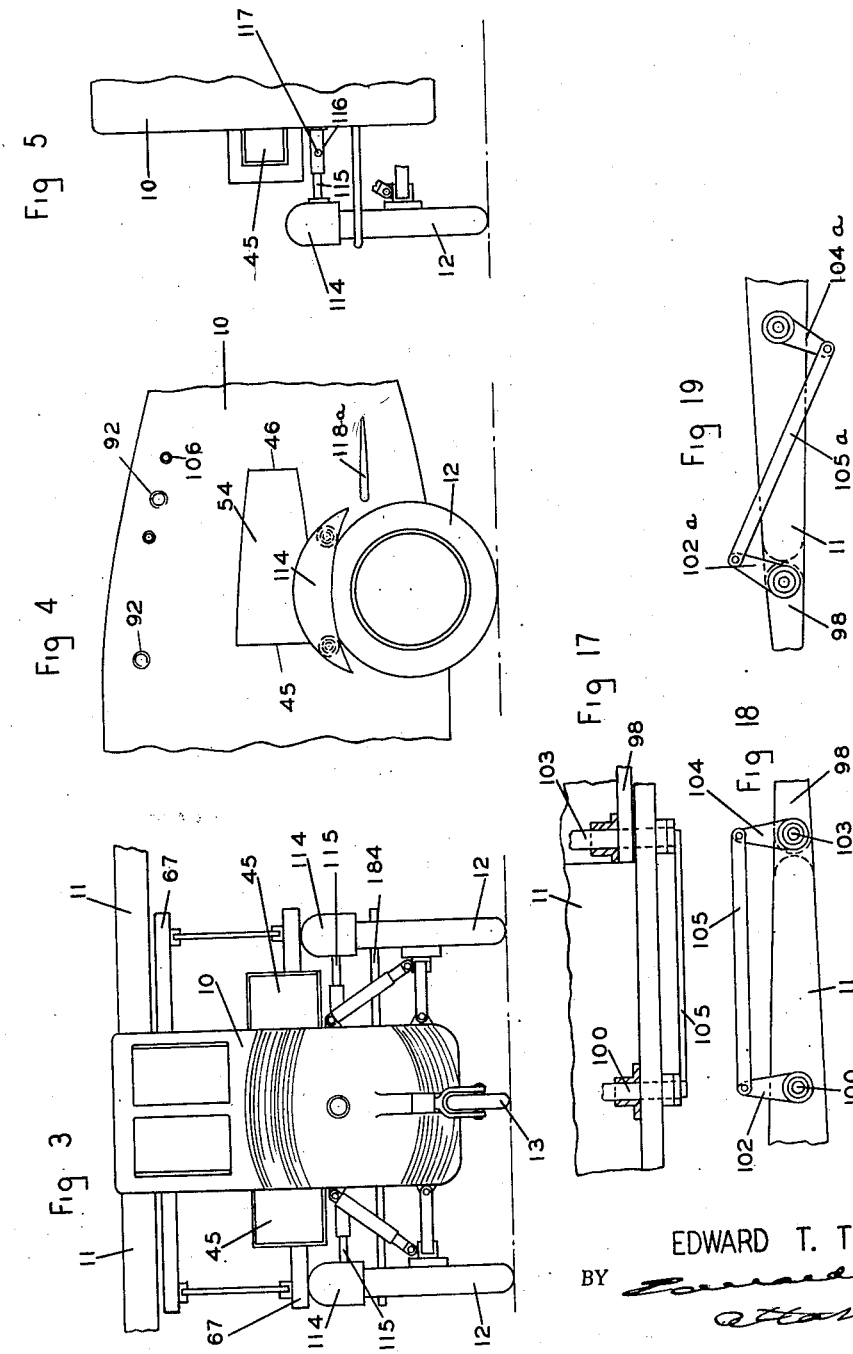
INVENTOR.
EDWARD T. TURNER

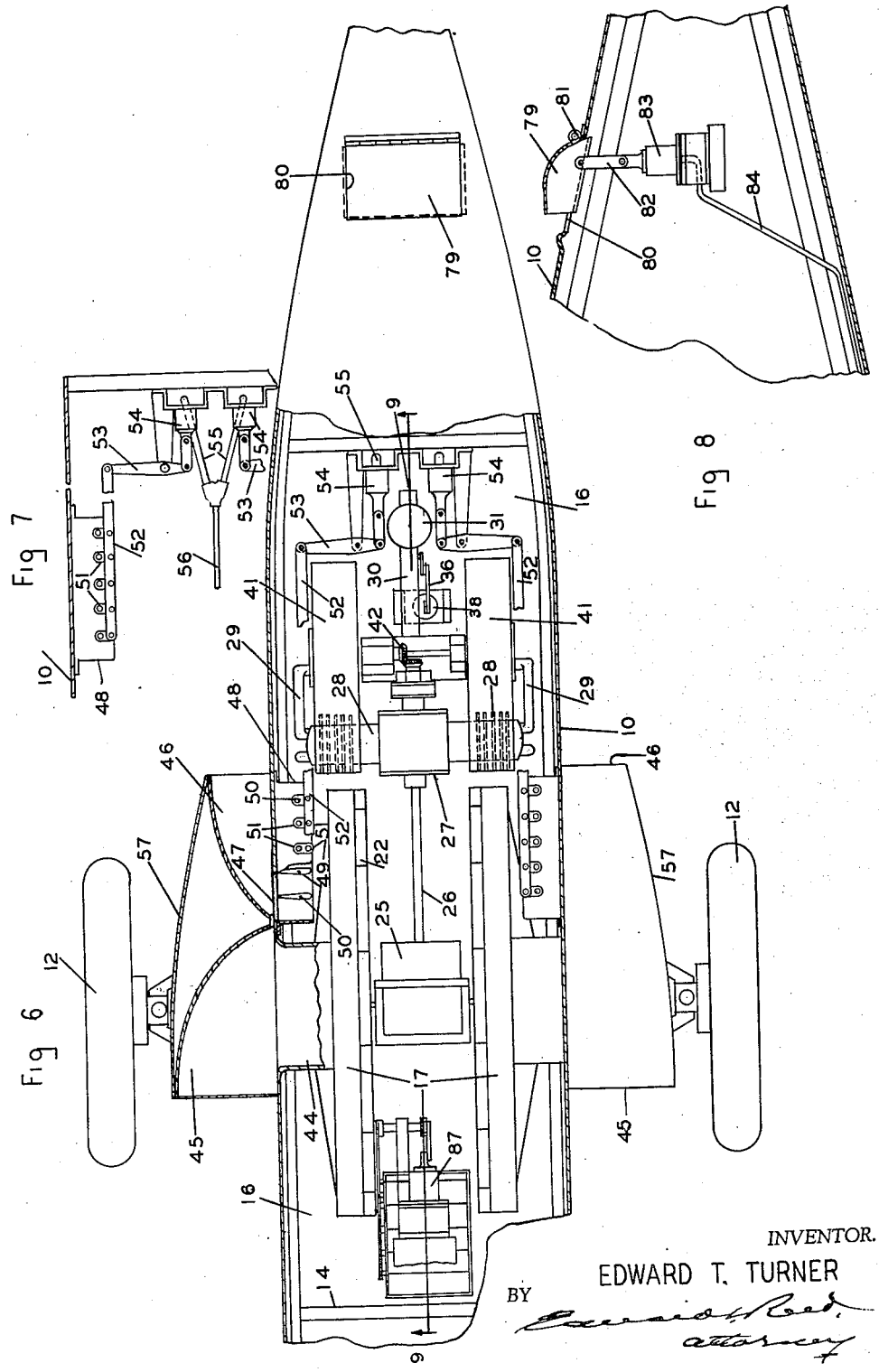

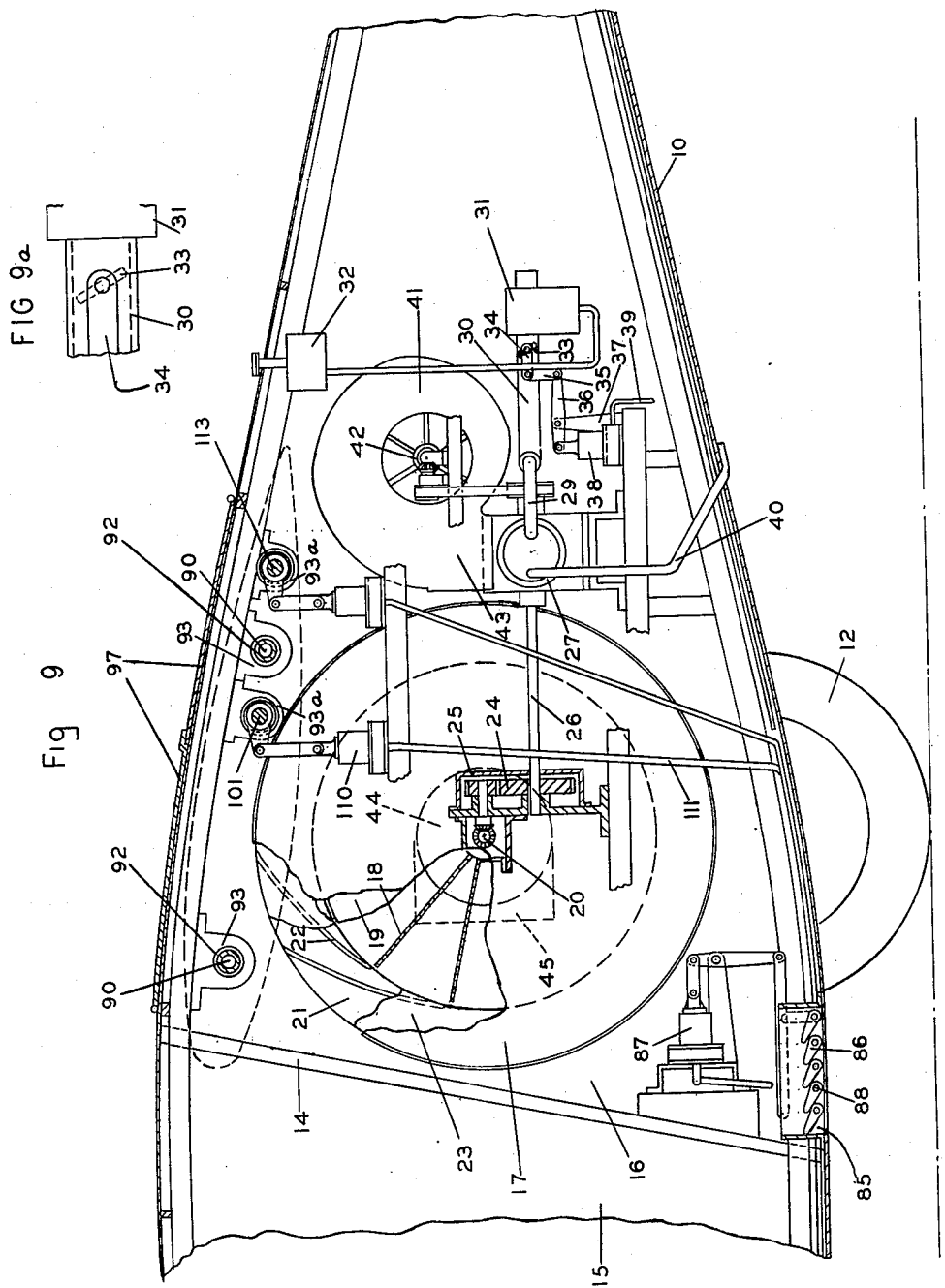

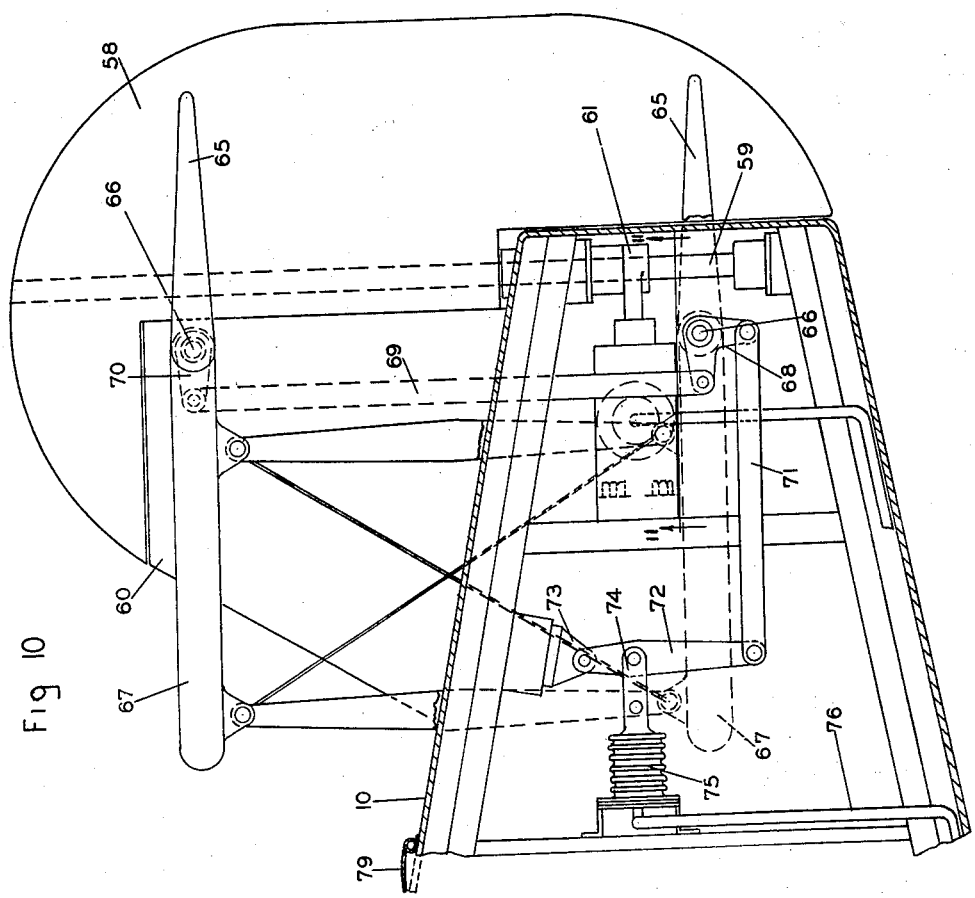
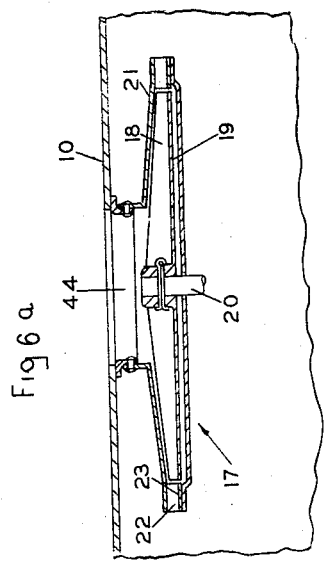
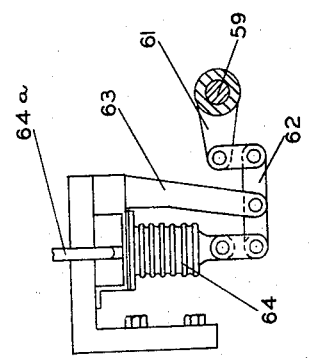

May 22, 1951 E. T. TURNER 2,553,952
SELF-PROPELLED VEHICLE
Filed Dec. 20, 1945 12 Sheets-Sheet 6
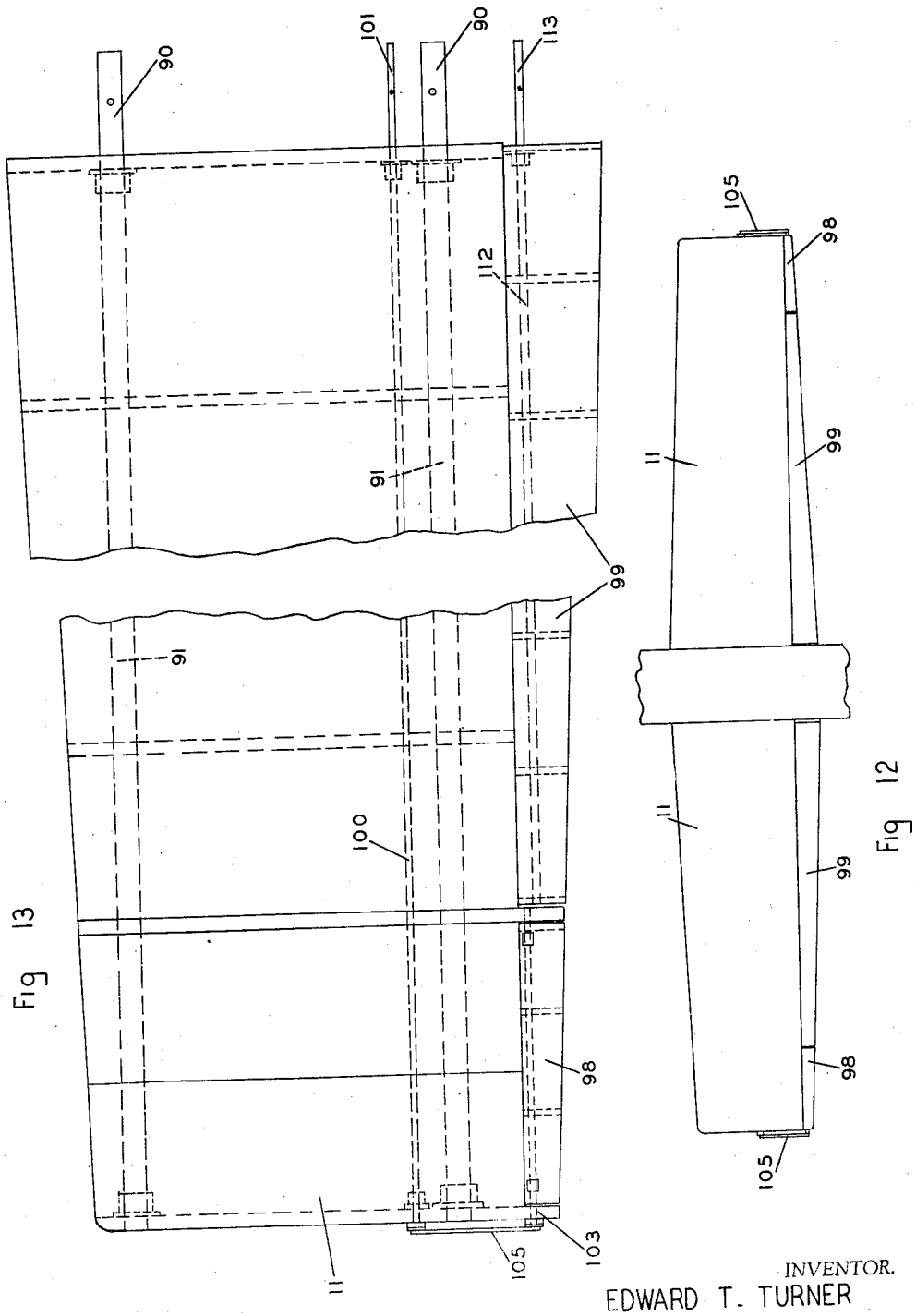
INVENTOR.
EDWARD T. TURNER
BY

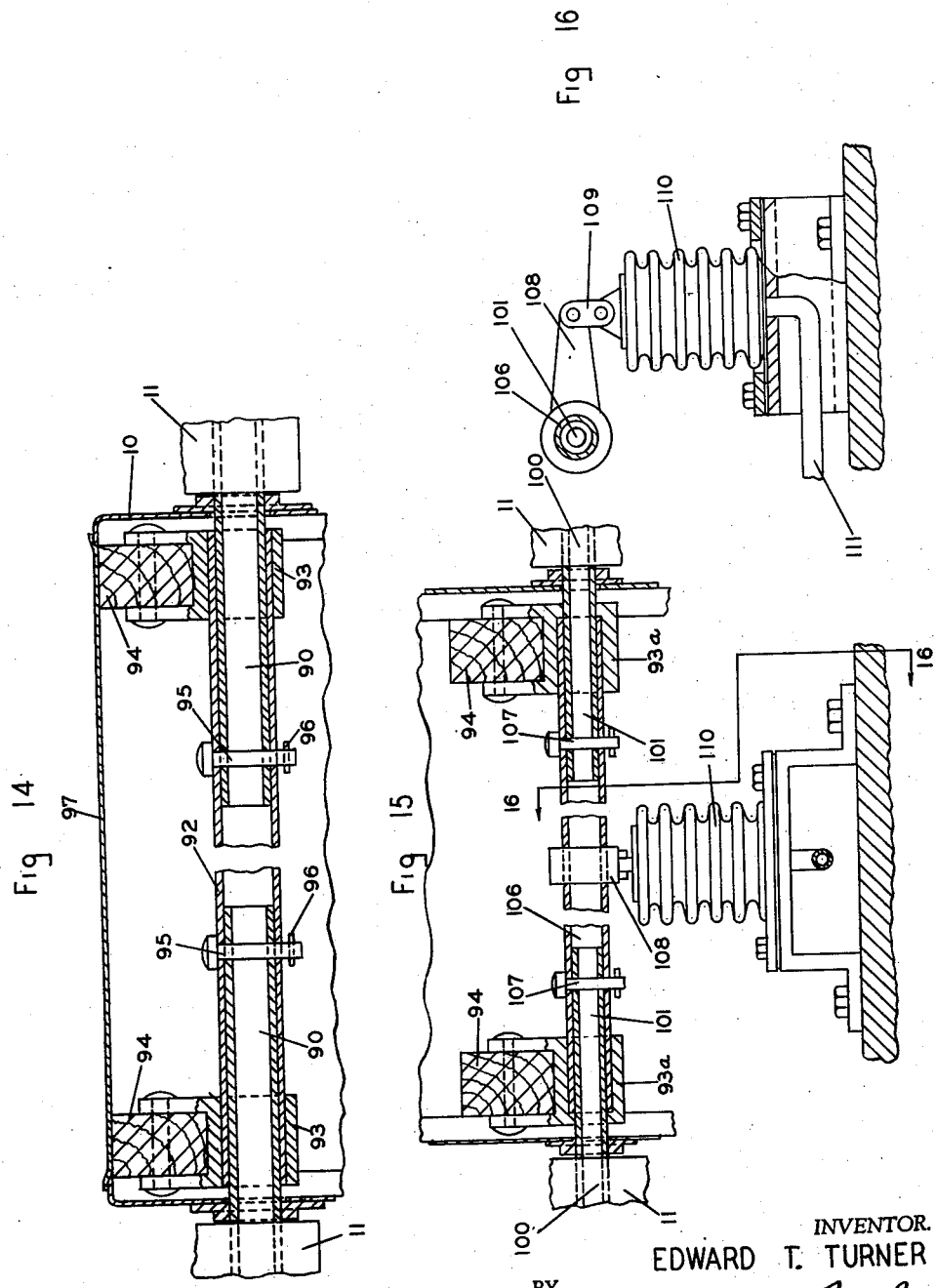

May 22, 1951  E. T. TURNER  2,553,952
SELF-PROPELLED VEHICLE
Filed Dec. 20, 1945  12 Sheets-Sheet 8
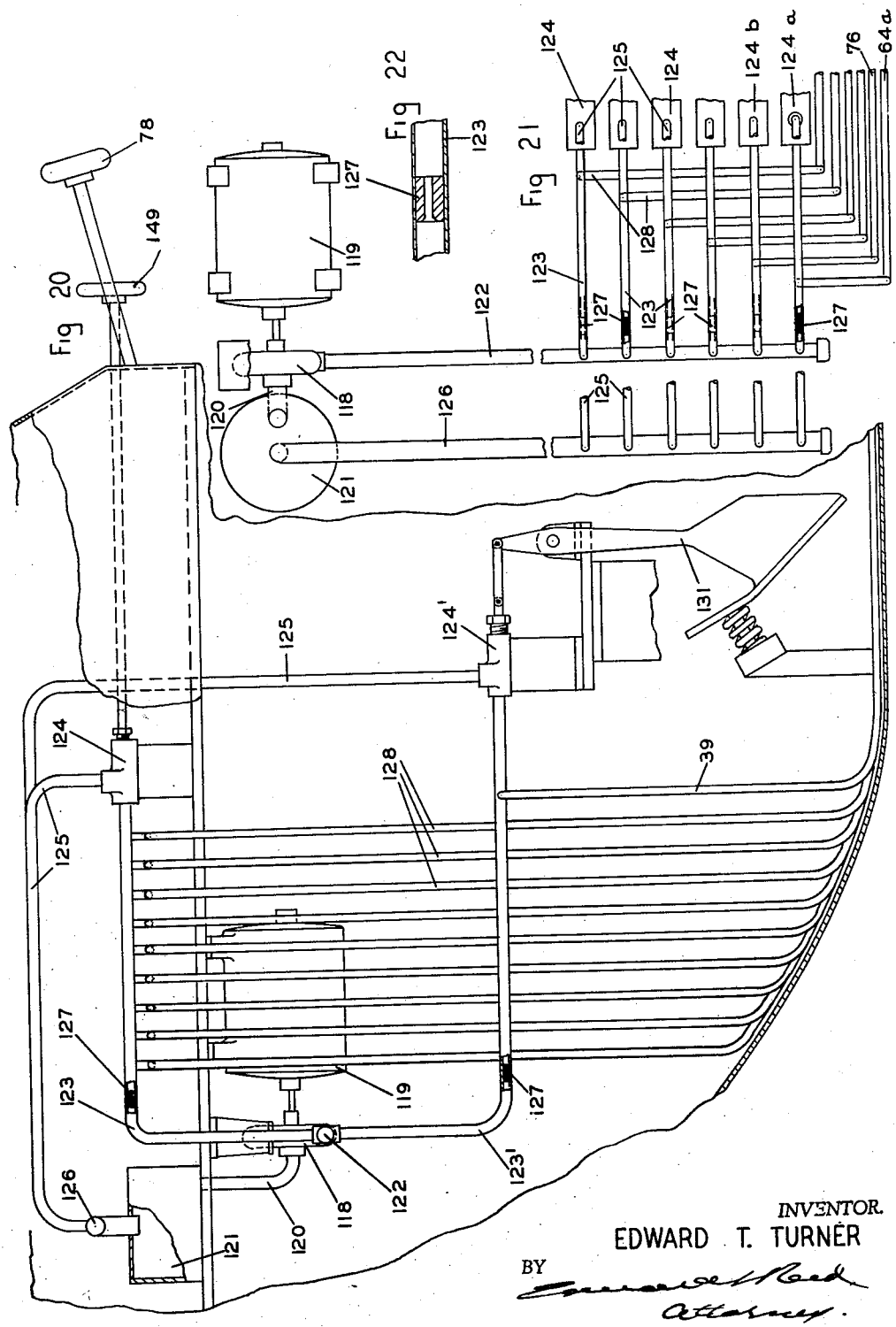
INVENTOR.
EDWARD T. TURNER
BY
Attorney.

INVENTOR.
EDWARD T. TURNER

May 22, 1951  E. T. TURNER  2,553,952
SELF-PROPELLED VEHICLE
Filed Dec. 20, 1945  12 Sheets-Sheet 10
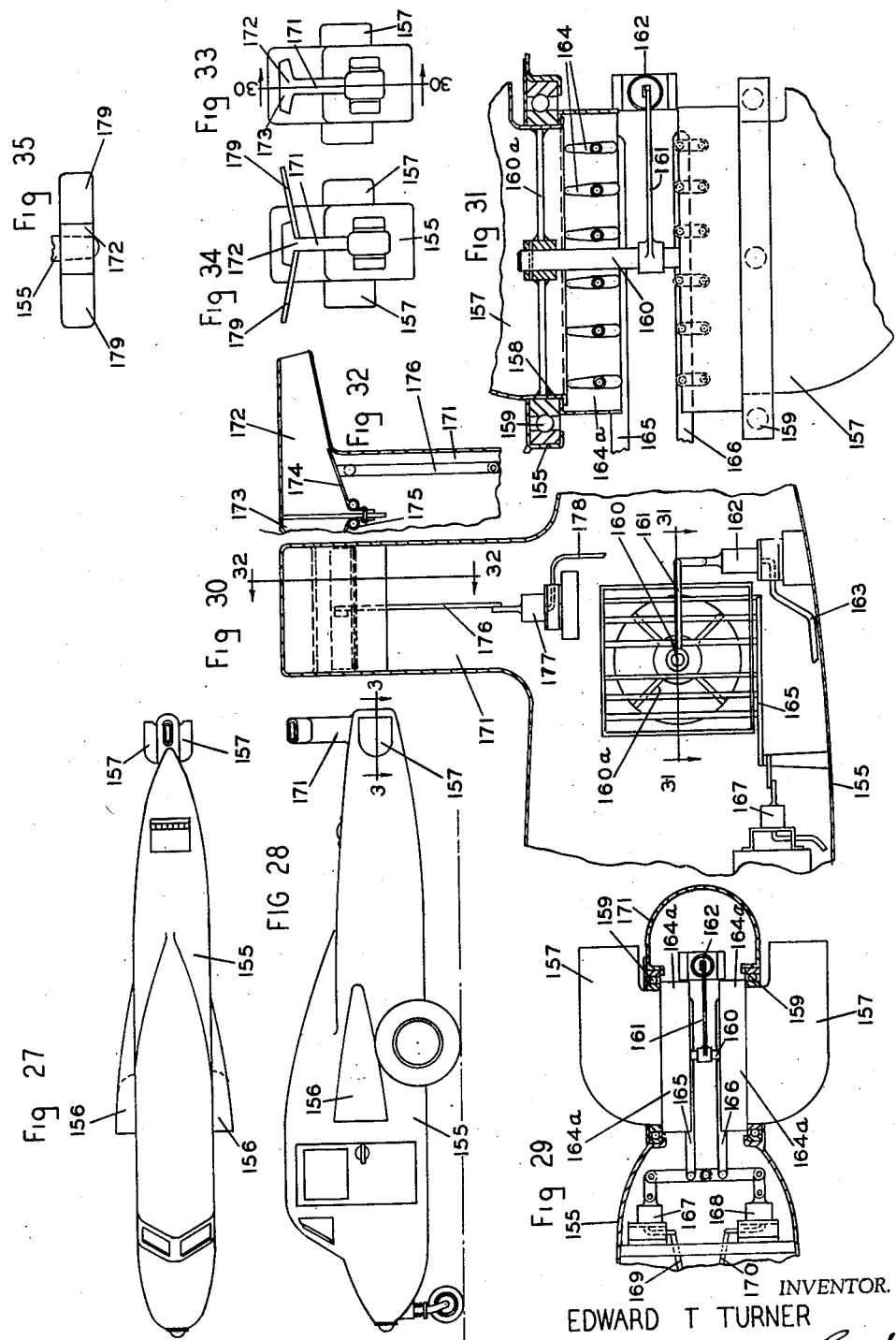
INVENTOR.
EDWARD T TURNER
BY
ATTORNEY May 22, 1951 E. T. TURNER 2,553,952
SELF-PROPELLED VEHICLE
Filed Dec. 20, 1945 12 Sheets-Sheet 11
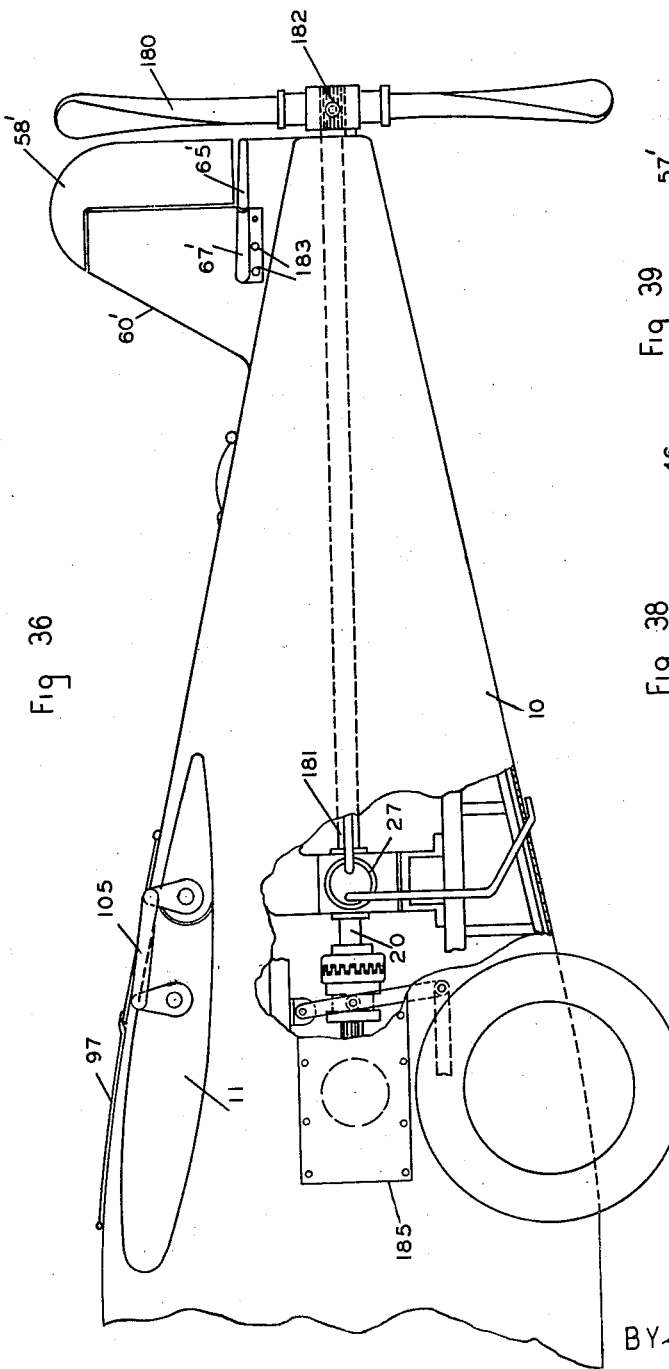
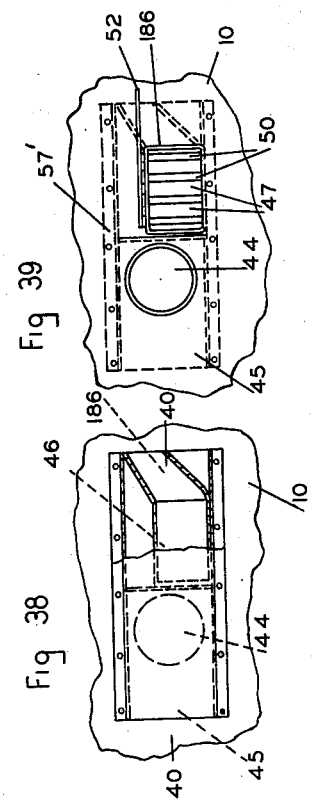
INVENTOR
EDWARD T. TURNER
BY *Edward Reed*
ATTORNEY

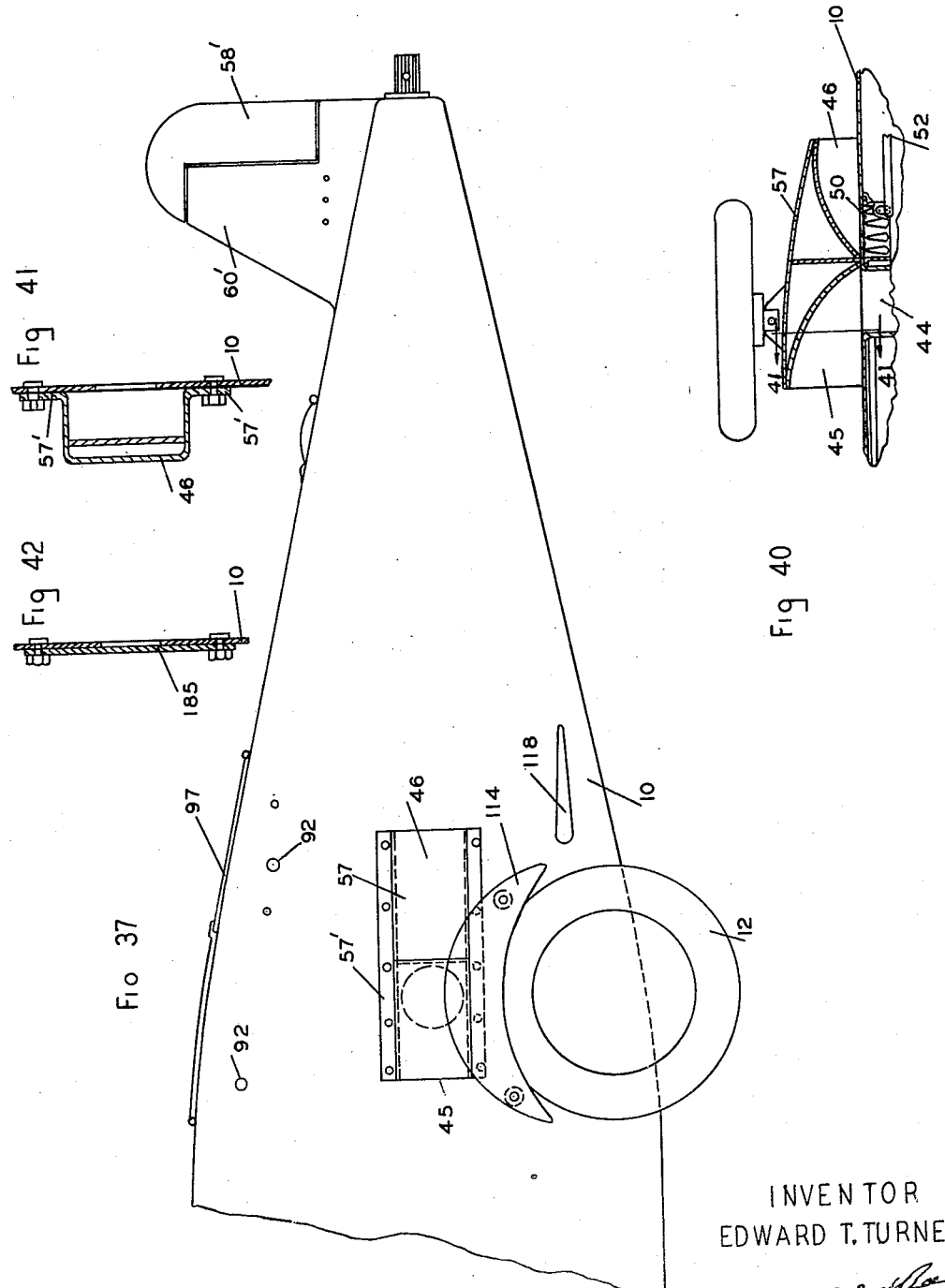

Patented May 22, 1951

2,553,952

UNITED STATES PATENT OFFICE 2,553,952

SELF-PROPELLED VEHICLE

Edward T. Turner, Dayton, Ohio; Edward T. Turner, Jr., administrator of said Edward T. Turner, deceased, assignor to Charline Elizabeth Turner Application December 20, 1945, Serial No. 636,188

14 Claims. (Cl. 244—2)

This invention relates to a self-propelled vehicle and more particularly to a combined land vehicle and airplane.

One object of the invention is to provide a vehicle which can be used either as an airplane or as a land vehicle without structural change other than mounting or demounting the wings.

A further object of the invention is to provide such a vehicle that can be stored in the ordinary private automobile garage.

A further object of the invention is to provide such a vehicle which employs the same propulsion means for propelling the vehicle in the air and on land.

A further object of the invention is to provide such a vehicle having propulsion means other than the usual airplane propeller and which enables the vehicle to be safely operated on roads or streets and also enables the body to be supported closer to the ground than is possible when a propeller is used.

A further object of the invention is to provide a vehicle in which air is compressed and discharged at high velocity to propel the vehicle.

A further object of the invention is to provide a vehicle which may be propelled and steered by jets of air discharged at relatively high velocity.

A further object of the invention is to provide a vehicle having de-mountable wings and devices for actuating the relatively movable parts of the wings which may be easily and quickly connected with or disconnected from controlling mechanism when the wings are mounted on or removed from the vehicle.

A further object of the invention is to provide a vehicle in which the various mechanisms for controlling the movement thereof are actuated by fluid pressure.

A further object of the invention is to provide a vehicle having simple and easily controlled means for selectively supplying the fluid under pressure to the actuating means for the controlling mechanisms.

A further object of the invention is to provide an automobile of simple efficient construction and of attractive appearance which can be produced at low cost.

Other objects of the invention may appear as the vehicle is described in detail.

Figure 24:
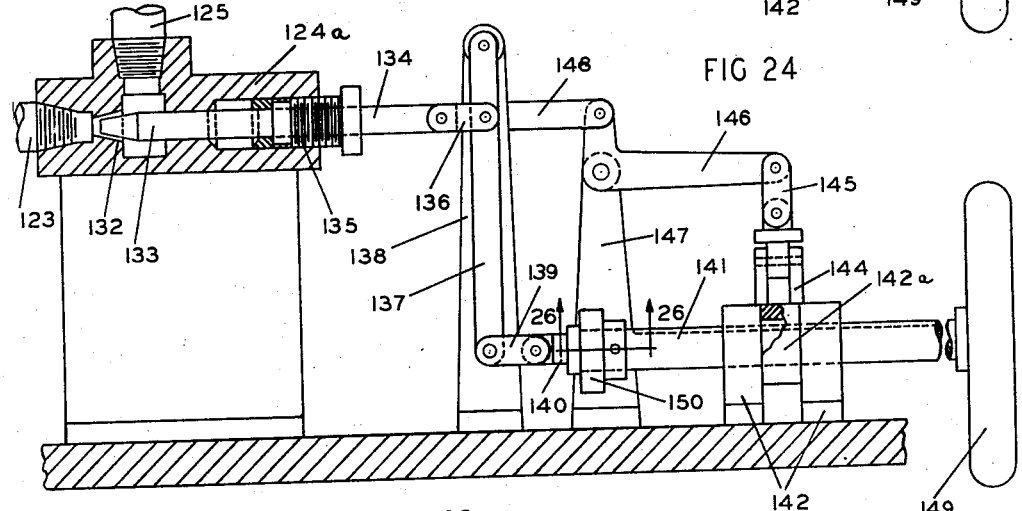
Figure 25:
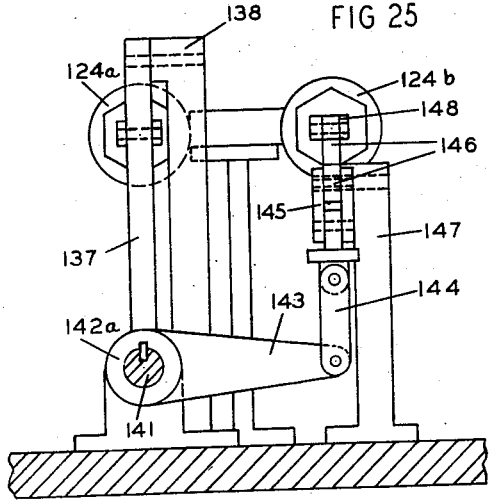
Figure 26:
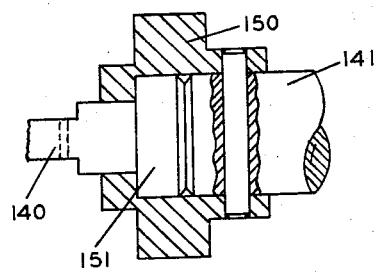

In the accompanying drawings Fig. 1 is a side elevation of a vehicle embodying my invention; Fig. 2 is a top plan view of the same, partly broken away; Fig. 3 is a front elevation of the vehicle with the wings broken away; Fig. 4 is a side elevation of a portion of the vehicle showing the demountable fenders; Fig. 5 is a front elevation of the demountable fenders; Fig. 6 is a plan view of a portion of the vehicle partly in section to show the interior mechanism; Fig. 6a is a section taken through one of the compressor units; Fig. 7 is a plan view of one set of louvers; Fig. 8 is a detail view of means for braking or reversing the movement of the vehicle; Fig. 9 is a vertical section taken through a portion of the vehicle on the line 9—9 of Fig. 6; Fig. 9a is a detail view of the throttle valve; Fig. 10 is a vertical section of the rear end of the vehicle taken on the line 10—10 of Fig. 2 and showing the rudder and elevator; Fig. 11 is a detail view of the actuating mechanism for the rudder; Fig. 12 is a plan view of the assembled wings; Fig. 13 is a plan view partly broken away of one of the wings; Fig. 14 is a transverse section showing the means for detachably mounting the wings on the body; Fig. 15 is a sectional view showing the means for detachably connecting the ailerons with the body and with their actuating devices; Fig. 16 is a section taken on the line 16—16 of Fig. 15 and partly broken away; Fig. 17 is a plan view showing the connection between one of the ailerons and its actuating shaft; Fig. 18 is an end view of the same; Fig. 19 is an end view of the connection between the other aileron and its actuating shaft; Fig. 20 is a side elevation, partly broken away, of the mechanism for supplying fluid under pressure to the various controlling devices; Fig. 21 is a plan view, partly broken away, of said mechanism; Fig. 22 is a sectional detail of a portion of one of the supply tubes; Fig. 23 is a plan view of a valve operating mechanism; Fig. 24 is an elevation, partly broken away, of the valve actuating mechanism showing one of the valves in section; Fig. 25 is an end view of the valve actuating mechanism with the shaft in section; Fig. 26 is a detail view of a connection between two parts of the shaft; Fig. 27 is a plan view of an automobile embodying the invention; Fig. 28 is a side view of said automobile; Fig. 29 is a horizontal section taken through the rear end of the body of said automobile showing the propulsion nozzles in plan; Fig. 30 is a vertical section taken through the rear end of the automobile body; Fig. 31 is a section taken on the line 31—31 of Fig. 30; Fig. 32 is a section on line 32—32 of Fig. 30, partly broken away; Fig. 33 is a rear elevation of the steering device of the automobile; Fig. 34 is a rear elevation of a modified arrangement of the steering device; Fig. 35 is a plan view of the steering device of Fig. 34; Fig. 36 is a side elevation, partly broken away, of the rear portion of a modified embodiment of the invention; Fig. 37 is a side elevation of said rear portion with the propeller and elevator removed; Fig. 38 is an outside elevation of one nozzle unit; Fig. 39 is an inside elevation showing the influent and effluent passages of the other nozzle unit; Fig. 40 is a section taken on the line 40—40 of Fig. 38; Fig. 41 is a section taken on line 41—41 of Fig. 40 showing detachable nozzle unit; and Fig. 42 is a section on this same line with the closure plate substituted for the nozzle unit.

The invention comprises a body, preferably streamlined, having demountable wings by which it may be supported in the air, wheels for supporting the same on land and means for steering the same both in the air or on land. The body has within the same a compressor for supplying compressed air to rearwardly directed jet nozzles which are arranged to receive the compressed air and discharge the same at high velocity to propel the vehicle, suitable means being provided for controlling the speed at which the vehicle is propelled and the direction in which it moves.

In the drawings I have illustrated one embodiment of the invention showing the same as a combined airplane and land vehicle and a modification showing parts of the invention embodied in a land vehicle only. It is to be understood, however, that these embodiments have been chosen for the purpose of illustration only and that the vehicle, as well as the several parts thereof, may take various forms without departing from the spirit of the invention.

In that embodiment illustrated in Figs. 1 to 26, the vehicle comprises an elongate body 10 which is provided with de-mountable wings 11 and with a three-wheel landing gear including a pair of wheels 12 adjacent the longitudinal center of the vehicle and a front wheel 13, these wheels also constituting a support for the vehicle when it is operated on land. The interior of the body is divided by an upright partition 14 into a front or operator's compartment 15 and a rear compartment 16. Mounted on the body are a plurality of effluent, or jet, nozzles from which air is discharged at high velocity to propel the vehicle and control the movement thereof, as will be hereinafter described.

Mounted within the body, and in the present instance in the forward portion of the rear compartment, is an air compressor which preferably comprises two compressing units 17 each including a rotary impeller which, as here shown, comprises a series of blades 18 rigidly secured to a disk-like member 19 which in turn is rigidly mounted on a drive shaft 20. A stationary wall 21 is mounted in the rear of the impeller and supports a plurality of vanes 22 which project forwardly therefrom about the periphery of the impeller blades and are connected one with the other by an annular member 23, the vanes being arranged to form volutes through which the air from the impeller is delivered through a passage or passages to the effluent nozzles, and which serve to convert a portion of the velocity energy of the air so discharged into pressure energy. The rear wall of each compressor unit is provided with an axial inlet which is connected with an influent conduit 44 leading from the atmosphere to the adjacent side of the body. Mounted on each side of the body in communication with the corresponding influent conduit is a forwardly facing hood or nozzle 45 which receives air from the atmosphere and when the vehicle is in motion delivers that air to the corresponding compressor unit at a velocity closely approaching the velocity at which the vehicle is moving.

The impellers of the two units are mounted on the same shaft 20 which is driven by suitable gearing 24 in a gear case 25 and connected by a shaft 26 with an engine 27. The engine 27 may be of a simple light weight construction and is here shown as comprising two opposed cylinders 28. The two cylinders are connected by fuel conduits 29 with a supply pipe 30 with which is connected a carburetor 31 which receives its fuel from the gravity tank 32. The supply of fuel to both cylinders is controlled by a throttle valve 33, in pipe 30, which is connected by links 34 and 35 with one end of a lever 36 which is mounted between its ends on a fixed support 37 and the other end of which is connected with a fluid actuated device, preferably in the form of a bellows 38, fluid under pressure being supplied to the bellows through a tube 39 as will be hereinafter described. Each cylinder is provided with an exhaust pipe 40 which, in the present arrangement, leads to the atmosphere but may discharge either within or without the body. To cool the cylinders of the engine there are provided two blowers 41 which are driven from the engine shaft by gearing 42 and are provided with downturned outlets 43 arranged to discharge the air over the respective cylinders.

The body is provided with effluent, or jet, nozzles in sufficient number and in such arrangement as may be required to propel the vehicle and to control such movements thereof as may be desired. The passage, or passages, conducting compressed air from the compressor to the several effluent nozzles may be of any suitable character and in the illustrated arrangement the rear compartment of the body constitutes a single passage communicating with each effluent nozzle. This compartment being of large capacity also constitutes an air chamber, in which a relatively large volume of air is maintained under pressure when the compressor is in operation. While the compressor is shown as mounted in and discharging directly into the passage or air chamber this is not essential and the compressor may be arranged in any desired relation to the passage or passages.

The propulsion of the vehicle is, in the present instance, effected by two rearwardly directed nozzles 46 mounted on the respective sides of the body in the rear of the influent nozzles 45 and communicating with the compressor through the interior of the body. Preferably each side wall of the body is provided with an opening 47 through which the air under pressure flows to the adjacent effluent nozzle. The shape of each nozzle is such as to convert pressure energy of the air into velocity energy so that the air is discharged from the nozzle at high velocity, causing a forward reaction on the front end of the nozzle and exerting thereon a forward force tending to move the vehicle in a forward direction. The arrangement is such that by maintaining the air in the air chamber at a pressure slightly above atmosphere pressure the discharge of the air from the two effluent nozzles will propel the vehicle at a relatively high speed.

The velocity of the jets from the propelling nozzles is, of course, controlled in part by the pressure of the air from the compressor which in turn is controlled by the throttle valve 33 which regulates the speed at which the compressor operates. It is desirable, however, to provide additional means for controlling the flow of air to the rearwardly directed propulsion nozzles not only for the purpose of controlling forward speed but also for the purpose of completely closing the propulsion nozzles when other and different passages are to be opened, as will hereinafter appear. For these purposes each opening 47 is provided with adjustable flow controlling means and, as here shown, each opening is surrounded by an inwardly extending flange or housing 48 which together with the opening 47 constitutes an effluent passage or conduit. Mounted in this connecting passage are a plurality of vanes or louvers 49 which are pivotally mounted at 50 so that they may move to positions transverse to the body to permit the full flow of air through the passage or to inclined overlapping positions to restrict or prevent the flow of air through the passage. The louvers may be actuated in any suitable manner and as here shown crank arms 51 are connected with the louvers at their axes and the several crank arms are pivotally connected with a reciprocatory bar 52 which extends rearwardly and is pivotally connected with one end of a lever 53, the other end of which is connected with a bellows 54 to which fluid under pressure is supplied by a conduit or tube 55, the extension of the bellows serving to move the louvers to inclined positions determined by the pressure in the bellows. The two effluent passages are controlled by separate bellows 54 which may be actuated either in unison or separately. In the present instance the tubes 55 of both bellows are connected with a single tube 56 leading to a source of fluid under pressure, so that the flow of air through both the fluid passages may be controlled by a single valve.

The jet nozzles 46 may be arranged in any desired relation to the influent nozzles 45 but in order to minimize air resistance they are here shown as arranged close to the influent nozzles, the two nozzles on each side of the body being combined in a unitary structure having a smooth continuous outer surface as shown at 57.

The body is provided adjacent its rear end with suitable means for stabilizing the vehicle and for controlling the direction of movement thereof when the latter is operated as an airplane. The controlling means may be of mechanical character, as shown in Figs. 1 and 10, or the control may be effected by compressed air from the compressor as shown in Figs. 27 to 32. As illustrated in Figs. 1 and 10, a vertical rudder 58 is rigidly secured to a shaft 59 which is mounted at the rear edge of a vertical stationary fin 60. Rigidly secured to the shaft 59 is a crank arm 61 which is operatively connected with one end of a lever 62 pivotally mounted on a bracket 63 and connected at its other end with a bellows 64 to which fluid under pressure is delivered by a tube 64a.

It is desirable that the stabilizer and the elevator should be of a transverse length not materially greater than the spacing between the wheels 12 so that they may not extend beyond the sides of the vehicle when the latter is propelled over streets or roads. For this purpose I have provided two elevators 65 aranged one above the other and rigidly connected with shafts 66 mounted respectively at the forward edges of horizontal stabilizers 67 rigidly supported on the rear portion of the body. Rigidly secured to the lower shaft 66 is a bell-crank 68, the horizontal arm of which is connected by a link 69 with a crank arm 70 rigidly secured to the upper shaft 66, to cause the elevators to move in unison and in the same direction. The second arm of the bellcrank is connected by a link 71 with one end of a lever 72, the other end of which is pivotally mounted in bracket 73. A link 74 connects the lever 72 between its ends with a bellows 75 which is provided with a fluid supply tube 76.

Any suitable means may be provided for steering the vehicle on land. In the present construction the front ground wheel 13 is movable about a substantially vertical axis so as to serve as a steering wheel and is connected by gearing 77 with a steering wheel 78 in the operator's compartment 15.

A forwardly directed jet, or jets, of air may be provided for the purpose of retarding or braking the forward movement of the vehicle either in the air or on land, and for imparting rearward movement to the vehicle on land. Preferably a single forwardly directed effluent nozzle 79 is mounted in the top wall of the body and connected with an air passage leading from the compressor, in the present instance the air chamber. To avoid air resistance the nozzle is movably supported in an opening 80 in the top wall of the body so that it may be moved into, or partly into, the latter when not in use. When, as in the present instance, the top wall forms a part of the air passage the movement of the nozzle out of and into the body may be utilized to control the discharge of air therefrom. As shown in Fig. 8, the nozzle is U-shaped in cross section, the forward end and the lower side thereof being open and the top and rear end being closed. Adjacent the rear end, the nozzle is pivotally mounted on the top wall, as shown at 81, and means are provided for moving the same about its pivotal axis to move the open forward end thereof above the top wall and thus open the nozzle to the extent necessary to provide the desired retarding action or rearward propulsion. When the nozzle is in its lower position the forward end thereof is within the air passage and, of course, no air is discharged therefrom. Any suitable means may be provided for controlling the position of the nozzle but preferably it is connected by a link 82 with the bellows 83 to which fluid under pressure is supplied by a tube 84.

It may also be desirable to provide the body with a downwardly directed effluent air passage to retard the downward movement of the vehicle and thus facilitate landing. As shown more particularly in Fig. 9, the bottom wall of the body is provided with a passage 85 arranged in front of the longitudinal center of gravity of the vehicle and communicating with the compressor. The flow of air through the effluent passage 85 may be controlled in any suitable manner, as by louvers 86 actuated by a bellows 87 in the same manner that the flow of air through the rearwardly directed nozzle 46 is controlled.

The wings 11 may be mounted on and removed from the vehicle in any suitable manner but the means for securing the wings to the body should be of a simple easily operated character so that the installation and removal of the wings will not require the services of a mechanic. As shown in Figs. 12 to 16, each wing is provided at its inner end with two inwardly extending studs 90 of substantial length, the studs preferably comprising the end portions of rods 91 which constitute parts of the wing structure. The studs 90 of the two wings are adapted to extend into and to be rigidly secured in sockets formed in the respective sides of the body. As shown in Figs. 9 and 14, tubular members 92 are rigidly mounted in supporting brackets 93 carried by frame members 94 of the body, the tubular members being of such internal diameter that the studs 90 will fit snugly in the respective ends thereof. The studs may be retained in the sockets in any suitable manner as by pins 95 extending through the tubular members and through the studs and provided with cotter pins 96 to prevent accidental removal thereof. The top wall of the body is provided with doors 97 hinged thereto which may be quickly and easily opened to permit free access to the wing supporting structure.

The wings are provided with the usual ailerons 98 and flaps 99. The operating devices for the ailerons and flaps being, of course, located in the body of the vehicle, it is necessary that the connections between the operating devices and the ailerons and flaps should be separable so that the wings may be removed. In the preferred arrangement, the ailerons are actuated by shafts 100 rotatably mounted in the respective wings and having end portions 101 extending inwardly beyond the inner ends of the respective wings. Each shaft 100 is connected at its outer end with the aileron for the wing on which the shaft is mounted. For this purpose the shaft 100 is provided at its outer end with a crank arm 102 and the pivot pin or shaft 103 for the aileron is likewise provided with a crank arm 104 which is connected with the crank arm 102 by a link 105. The two ailerons are actuated simultaneously by a single actuating mechanism but they must move in opposite directions about their respective axes, therefore, the crank arms 102 and 104 for one aileron extend in the same direction and the crank arms 102a and 104a of the other aileron extend in opposite directions, as shown in Figs. 17 to 19. The inwardly extending end portions 101 of the shafts 100 may be connected one with the other for rotation in unison in any suitable manner. In the present instance, a tubular member 106 is rotatably mounted in bearings in supporting brackets 93a which are carried by the main frame, and the end portions of that tubular member constitute sockets into which the end portions of the respective shafts 100 extend and in which they are retained by pins 107, which also cause the two shafts to rotate with the tubular member 106. Rigidly secured to the tubular member is a crank arm 108 the outer end of which is connected by a link 109 with a bellows 110, the latter being connected with a fluid supply tube 111. Thus the rotation of the socket member 106 will rotate the two shafts 100 in the same direction but due to the reverse connections between the ends of the shafts and the respective ailerons the latter will move in opposite directions.

Each flap 99 is supported by and rigidly secured to a shaft 112 the end portion 113 of which extends beyond the inner end of the wing. The end portions of the two flap shafts are mounted in the body and connected one with the other and with an actuating device in the same manner as shown in Figs. 15 and 16 in connection with the aileron shafts, except that both flaps move in the same direction. Thus it will be apparent that the wings may be quickly and easily mounted on and de-mounted from the body of the vehicle and the ailerons and flaps connected with their actuating devices without the use of tools.

It is also desirable that the vehicle, when operating on land, should be provided with fenders for the wheels 12 and in Figs. 3, 4, and 5, there are shown fenders 114 which are supported by rods or studs 115 which extend into tubular sockets 116 and are removably retained therein by pins 117. Thus the fenders may be easily removed to reduce air resistance when the vehicle is used as an airplane and can be quickly remounted when the vehicle is to be used as an automobile. I have also provided rearwardly extending mud guards 118a in the rear of the respective wheels but inasmuch as these mud guards are thin and streamlined it is not important that they be removed.

It will be apparent, therefore, that when the vehicle is in use as an airplane and lands at the air field the wings may be quickly and easily de-mounted and stored, and the fenders, when they are used, can be mounted on the vehicle and the latter operated as an automobile to the owner's garage, in which the vehicle can be stored. The over-all dimensions of the vehicle, with the wings removed, not being materially greater than the corresponding dimensions of an ordinary automobile, the vehicle can be stored in an ordinary automobile garage. In this manner, the vehicle may be used as an automobile to convey the operator to and from a landing field and then used as an airplane to convey him from one air field to another.

The means for controlling the various operable parts of the vehicle may be of any suitable character and may be located in any position which is convenient for manipulation by the operator. In the present vehicle fluid operated devices, such as bellows, have been provided for controlling the respective operable parts and means are provided in the forward or operator's compartment for selectively supplying fluid, usually a suitable liquid, under pressure to the respective fluid actuated devices. In Figs. 20 to 26, I have illustrated an apparatus by which the fluid may be selectively supplied to the various bellows and which is simple in construction and operation and easily manipulated by the operator. This apparatus preferably comprises a pump connected with a source of fluid supply and in a fluid circuit through which the fluid may be circulated from the pump through a controlling valve and then back to the pump, tubes extending from the circuit between the pump and the valve to supply fluid under pressure to the respective bellows for the part or parts which are to be operated. As here shown, the apparatus comprises a rotary pump 118 which is driven by a motor 119 and has its intake connected by a pipe 120 with a liquid reservoir 121. A header 122 is connected with the outlet of the pump and a plurality of tubes 123 and 123' extend from the header to separate valves 124 and 124', and return tubes 125 extend from the valves to a header 126 which discharges into liquid reservoir 121. Each tube 123 and 123' is provided between the valve and the header 122 with a restricted orifice 127. A branch tube 128 is connected with each tube 123 between the valve 124 and the restricted orifice 127 and leads to or forms a part of the tube for the bellows of one of the parts to be operated. Thus when a valve 124 is open the liquid flows from the pump through the header 122, tube 123, valve 124, return tube 125, and header 126 to the reservoir 121, and thence through pipe 120 to the intake of the pump. When the valve is closed or partly closed the liquid or a portion thereof flows through the corresponding branch tube 128 to the bellows until the latter has been extended to the desired extent, and by regulating the extent to which the valve is opened the desired pressure may be exerted on the bellows.

The valves may be actuated in any suitable and convenient manner and in the present arrangement the tube 123' extends downwardly from the header 122 and rearwardly to valve 124' which is actuated by a foot lever 131 arranged adjacent the operator's seat and branch tube 39 leads from the tube 123' to the bellows 38 which actuates the throttle valve of the engine. The remaining valves are separately controlled by suitable actuating devices each of which may be connected with one or a plurality of valves. The several valves are preferably connected in pairs and the valves of each pair actuated by a single actuating device. In Figs. 23 to 26, one such pair of valves is shown which, for example, may control the flow of liquid through tube 64a to the bellows for the rudder and through tube 76 to bellows for the elevators. For convenience of reference, these valves are numbered respectively 124a and 124b. As shown in Fig. 24, each of these valves has a valve seat 132 in line with the inlet opening and a valve member 133 which is provided with a tapered end to engage that valve seat and is movable longitudinally. The valve member preferably forms of part of a rod the outer end portion 134 of which constitutes a valve stem and is slidably mounted in a packing gland 135 in the valve casing. In this respect the two valves are identical. The outer end of the valve stem for the valve 124a is connected by a link 136 with a lever 137 pivotally mounted at its upper end on an upright standard 138 and pivotally connected at its lower end by a link 139 with the end portion 140 of an actuating shaft 141. This shaft 141 is mounted in bearings 142 for both axial movement and rotary movement, and the axial movement thereof rocks the lever 137 about its upper axis to move the valve member 133 of valve 124a toward and from its seat. Secured to the shaft 141 for rotation therewith is a collar 142a to which is rigidly secured an arm 143 the outer end of which is connected by links 144 and 145 with one arm of a bell-crank 146 pivotally mounted on a standard 147. The other arm of this bell-crank is connected by a link 148 with the stem 134 of valve 124b. Thus when the shaft 141 is rotated the valve member of valve 124b is moved toward or from its seat. Connected with the outer end of the shaft 141 is a suitable operating handle, such as a small diameter wheel 149, by which the shaft may be rotated or moved lengthwise. To permit the shaft to rotate with relation to the lever 137 and to impart movement to that lever when the shaft is moved lengthwise, the main portion 141 of the shaft is rigidly secured to a coupling member 150 and the part 140 of the shaft is provided with a head 151 arranged within the coupling member and on which the coupling member is free to rotate. The head 151 and the adjacent end of the shaft 141 are maintained in such close relation one to the other that there is little or no relative movement thereof when the shaft is moved longitudinally.

As has been stated the vehicle can be used as an automobile and it may be so used without being capable of use as an airplane. In Figs. 27 to 34, I have illustrated a vehicle which is not provided with wings and is operable only as an automobile but it could, if desired, be provided with de-mountable wings as above described to enable it to travel in the air as well as on land. The body 155 is generally similar to the body 10 hereinbefore described and it is divided into two compartments in the same manner as that body. The compressor, its associated parts and the controlling devices are similar to the corresponding parts of the combined vehicle, with the exception that the rearwardly directed jet nozzles are arranged near the rear end of the body at a substantial distance from the influent nozzles 156 which supply air to the compressor units. The effluent or jet nozzles 157 are arranged on opposite sides of the narrow rear end portion of the body and are directed rearwardly so that the jets of high velocity air will propel the vehicle forwardly at high speed. To avoid objectionable results due to the directing of the high velocity air jets at a low level, the nozzles are so controlled that they may be adjusted to direct the air jets upwardly at an acute angle to the line of movement of the vehicle, thus causing the same to pass above adjacent persons or vehicles. For this purpose the nozzles 157 are provided with inwardly extending parts 158 (Fig. 31) which are rotatably mounted in bearings 159 in the respective sides of the body 155. The adjacent parts 158 of the two nozzles are rigidly connected one with the other by a shaft 160, which is secured to spiders 160a carried by the respective nozzles. Rigidly secured to the shaft 160 is an arm 161 which is connected with a bellows 162 to which fluid is supplied by a tube 163, thus enabling the operator to tilt the nozzles upwardly or to maintain them in a horizontal position when the rearward blast of air is not objectionable.

The flow of air through the jet nozzles 157 is controlled in substantially the same manner as it is through the nozzles 46, that is, a plurality of louvers 164 are mounted in each passage 164a leading from the air passage within the body to the nozzles, the louvers being actuated by bars 165 and 166 connected through linkage with the bellows 167 and 168, which are connected by tubes 169 and 170 with a source of fluid under pressure.

This vehicle is also steered by air jets and to this end an upright conduit 171 is mounted on the rear end of the body in open communication with the air passage and is provided at its upper end with laterally extending nozzles 172 and 173, the flow of air from the conduit 171 to the respective nozzles being controlled by valves 174 and 175 which are connected by links 176 with bellows 177 which is provided with a fluid supply tube 178, the actuating means for one valve only being shown. Thus by opening one or the other of the valves 174 and 175 air at high velocity will be discharged in the direction in which the vehicle is to turn, thus causing the vehicle to move about a vertical axis on its supporting wheels.

The upwardly directed propelling jets from the nozzle 157 tend to depress the rear end of the body and to lift the front wheel off the ground. Thus when the vehicle is traveling at high speed the nozzles 157 may be so adjusted as to so lift the front wheel and cause the vehicle to travel on two wheels only. To counteract this tendency of the upwardly directed air jets to move the tail end of the body downwardly I have mounted on the conduit 171 adjacent the nozzles stationary fins 179 which will resist the downward movement and will establish a balanced condition in which the body may remain in a substantially constant position while moving on the two wheels.

While I prefer to utilize jet propulsion both on land and in the air, this is not essential and in Figs. 36 to 40 I have shown a modified form of the vehicle which uses jet propulsion on land and a propeller in the air. In the arrangement there shown, a pusher propeller 180 is removably mounted on a shaft 181 connected with the engine 27 and extending rearwardly beyond the rear end of the body. The propeller may be removably attached to the shaft in any suitable manner, as by splines and a cross pin 182. A vertical rudder 58' and a stationary fin 60' are provided, together with a single elevator 65' and a stabilizer 67'. The rudder and the elevator are preferably operated in the manner above described and the elevator and stabilizer are removably mounted on the body, as by bolts 183. A clutch 184 is interposed between the engine shaft 26 and the compressor, so that the latter may be disconnected from the engine when the propeller is used. It is desirable that the influent and effluent nozzle units 57 should be removed to avoid unnecessary air resistance when the vehicle is in the air. For that purpose each unit is provided with a flange 57' secured to the body by bolts. When the units are removed the air inlet and outlet openings are closed by a plate 185 which is bolted or otherwise secured to the body. Thus the vehicle may be operated as a land vehicle by merely demounting the wings and removing the propeller and, if desired, removing the elevator and the stabilizer. When the vehicle is to operate in the air, the propeller, wings, stabilizer, and elevator are remounted and the compressor disconnected from the engine, and if desired the nozzle units may be removed and replaced by the plates 185, and the fenders 114 may also be removed.

When jet propulsion is not used for propelling the vehicle in the air, the propulsion nozzles 46 may be permanently inclined upwardly and rearwardly and in the arrangement shown in Figs. 38 and 39 each of these nozzles is provided with a fixed inclined passage 186 through which the effluent air is discharged upwardly and rearwardly.

While I have shown and described one embodiment of my invention, together with certain modifications thereof, I wish it to be understood that I do not desire to be limited to the details thereof as various modifications may occur to a person skilled in the art.

Having now fully described my invention what I claim is new and desire to secure by Letters Patent, is:

1. A self-propelled vehicle comprising a body, wheels to support said vehicle on land, de-mountable wings to support said vehicle in the air, each wing including an element pivotally connected with the rear edge thereof, shafts extending lengthwise of the respective wings and operatively connected with the respective elements, an actuating device mounted on said body substantially in line with said shafts for movement about an axis transverse to said body, said device and said shafts having at their adjacent ends means for operatively connecting the same one with the other when said wings are mounted on said body, and means for propelling said vehicle in the air or on land.

2. A self-propelled vehicle comprising a body, wheels to support said vehicle on land, demountable wings to support said vehicle in the air, each wing including an aileron and a flap, separate shafts connected with said aileron and said flap and having parts extending beyond the inner end of said wing, two tubular elements rotatably mounted on said body and arranged respectively to receive the projecting ends of the aileron shafts and the flap shafts, means for connecting said shafts with the respective rotatable members for rotation therewith, means for actuating said rotatable members, and means for propelling said vehicle in the air and on land.

3. A self-propelled vehicle comprising a body, wheels to support said vehicle on land, de-mountable wings to support said vehicle in the air, each wing including an aileron and a flap, studs rigidly secured to and projecting inwardly beyond the inner end of each wing, shafts extending lengthwise through each wing, operatively connected respectively with said aileron and said flap and having parts extending beyond the inner end of said wing, tubular members rigidly mounted on said body, each tubular member being arranged to receive the corresponding studs on the two wings, two tubular members rotatably mounted on said body and arranged respectively to receive the projecting ends of the aileron operating shafts and the flap operating shafts, means for connecting said shafts with the respective rotatable members for rotation therewith, means for actuating said rotatable members, and means for propelling said vehicle in the air or on land.

4. In a self-propelled vehicle, an elongate hollow body, an air compressor in said body provided with axial intake passages on the respective sides thereof, relatively large forwardly facing influent nozzles on the respective sides of said body having lateral openings connected with the respective intake passages of said compressor, said body having lateral passages in the rear of said influent nozzles and communicating with said compressor, rearwardly directed effluent nozzles on the respective sides of said body, extending across and communicating with the lateral passages in said body, and means in said body for controlling the flow of air from said compressor to said effluent nozzles.

5. In a self-propelled vehicle, an elongate hollow body, an air compressor in said body provided with axial intake passages on the respective sides thereof, relatively large forwardly facing influent nozzles on the respective sides of said body having lateral openings connected with the respective intake passages of said compressor, said body having lateral passages in the rear of said influent nozzles communicating with said compressor, rearwardly directed effluent nozzles on the respective sides of said body, extending across and communicating with the lateral passages in said body, means in said body for controlling the flow of air from said compressor to said effluent nozzles, the influent nozzle and the effluent nozzle on each side of said body being arranged close one to the other in a line extending lengthwise of said body, and a member of thin material extending about the exteriors of said nozzles on each side of said body and combining the same in a unitary structure having a smooth continuous outer surface.

6. In a self-propelled vehicle, an elongate hollow body having an operator's compartment in the forward portion thereof and an air chamber in the rear of said operator's compartment, an air compressor in said air chamber discharging directly into said air chamber and having intake passages at the respective sides thereof, forwardly facing influent nozzles at the respective sides of said body, communicating with the intake passages of said compressor, rearwardly directed effluent nozzles on the respective sides of said body, communicating with said air chamber, means adjacent the rear end of said body for controlling the direction of movement thereof, and means operable from the operator's compartment to control the flow of air through said effluent nozzles and to actuate said direction controlling means.

7. A self-propelled vehicle comprising an elongate body having an operator's compartment and an air chamber, wheels for supporting said vehicle on land, de-mountable wings for supporting said vehicle in the air, a compressor in said body for supplying compressed air to said air chamber, influent nozzles at the respective sides of said body for supplying air to said compressor, an engine drivingly connected with said compressor, a device for controlling the operation of said engine, a blower driven by said engine to discharge cooling air over the latter, rearwardly directed jet nozzles at the respective sides of said body, effluent passages connecting said nozzles with said air chamber, separate devices for controlling the flow of air through said effluent passages, means for operating said controlling devices, a rudder and an elevator at the rear end of said body, said elevator being of a width not materially greater than the distance between said wheels, separate means for operating said rudder and said elevator, a downwardly directed air passage adjacent the longitudinal center of said vehicle and communicating with said air chamber, a device for controlling the flow of air through said downwardly directed air passage, means for operating said controlling means, and means in the operator's compartment for actuating the respective operating means.

8. A self-propelled vehicle comprising a body, an air compressor on said body, an engine drivingly connected with said compressor, a hydraulic device for controlling the operation of said engine, rearwardly directed jet nozzles connected with said compressor, means for controlling the flow of air to said nozzles, a hydraulic device for actuating said flow controlling means, means for controlling the direction of the movement of said vehicle, a hydraulic device for actuating said direction controlling means, a source of liquid under pressure, and means selectively operable by the operator to deliver liquid from said source to the respective hydraulic devices.

9. A self-propelled vehicle comprising a body, an air compressor on said body, an engine drivingly connected with said compressor, a hydraulic device for controlling the operation of said engine, rearwardly directed jet nozzles connected with said compressor, means for controlling the flow of air to said nozzles, a hydraulic device for actuating said flow controlling means, means for controlling the direction of the movement of said vehicle, a hydraulic device for actuating said direction controlling means, a pump, a liquid reservoir connected with the intake of said pump, a header connected with the outlet of said pump, a plurality of tubes connected with said header, a valve connected with each tube, a return tube leading from each valve to said receptacle, and a branch tube connected with the respective first-mentioned tubes between the valves and said header and leading to the respective hydraulic devices.

10. A self-propelled vehicle comprising a body, an air compressor in said body, an engine drivingly connected with compressor, a hydraulic device for controlling the operation of said engine, rearwardly directed jet nozzles connected with said compressor, means for controlling the flow of air to said nozzles, a hydraulic device for actuating said flow controlling means, means for controlling the direction of the movement of said vehicle, a hydraulic device for actuating said direction controlling means, a pump, a liquid reservoir connected with the intake of said pump, a header connected with the outlet of said pump, a plurality of tubes connected with said header, a valve connected with each tube, a return tube leading from each valve to said receptacle, branch tubes connected with the respective first-mentioned tubes between the valves and said header and leading to the respective hydraulic devices, a valve controlling shaft mounted for both axial movement and rotary movement, an actuating device connected with said shaft, means controlled by said axial movement of said shaft for actuating one of said valves, and means controlled by the rotary movement of said shaft for actuating another of said valves.

11. In a self-propelled vehicle including means for propelling the same and for controlling the direction and movement thereof, means including a bellows for controlling the operation of said propelling means, devices for actuating said direction controlling means including a bellows, a pump, a fluid reservoir connected with the inlet to said pump, a header connected with the outlet of said pump, a plurality of conduits connected with said header and each having a restricted orifice, valves connected with the respective conduits beyond said orifices, other conduits leading from the respective valves to said liquid reservoir, and branch conduits connected with the respective first-mentioned conduits between said valves and said orifices and leading to the respective bellows.

12. In a self-propelled vehicle, two devices for controlling respectively the operation of two parts of said vehicle, each device including a bellows, a pump, a fluid reservoir connected with the intake of said pump, two tubes connected with the outlet of said pump, a restricted orifice in each tube, separate valves connected with said tubes beyond said orifices, a return tube leading from each valve to said reservoir, tubes connecting the first-mentioned tubes with the respective bellows, and a single device having means for separately actuating the respective valves.

13. In a self-propelled vehicle, two devices for controlling respectively the operation of two parts of said vehicle, each device including a bellows, a pump, a fluid reservoir connected with the intake of said pump, two tubes connected with the outlet of said pump, a restricted orifice in each tube, separate valves connected with said tubes beyond said orifices, a return tube leading from each valve to said reservoir, tubes connecting the first-mentioned tubes with the respective bellows, a shaft mounted for both axial movement and rotary movement, means controlled by the axial movement of said shaft for actuating one of said valves, means controlled by the rotary movement of said shaft for actuating the other of said valves, and a single operating device connected with said shaft for imparting either movement thereto.

14. A jet propelled vehicle comprising a body, means for movably supporting said body, said body including a part constituting an air chamber, a rotary air compressor mounted in said chamber and comprising two separate compressor units, each of said units including a stationary wall adjacent one side of said body and having an axial inlet, an impeller including a disk-like member and a plurality of blades carried by that side of said member adjacent said stationary wall, a series of vanes carried by said stationary wall and extending across and substantially tangential to the path of the outer ends of said impeller blades, and an annular member secured to and closing the spaces between the lateral edges of said vanes and arranged substantially in the plane of the peripheral portion of said disk-like member, influent conduits connecting said axial inlets with the atmosphere at the respective sides of said body, rearwardly directed effluent nozzles arranged at the respective sides of said body in the rear of said influent conduits to propel said vehicle, and means for supplying compressed air from said air chamber to said nozzle.

EDWARD T. TURNER.

REFERENCES CITED

The following references are of record in the file of this patent:

UNITED STATES PATENTS

| Number | Name | Date |
|---|---|---|
| 1,234,882 | Doble | July 31, 1917 |
| 1,457,871 | Bonsiakos | June 5, 1923 |
| 1,585,281 | Craddock | May 18, 1926 |
| 1,585,529 | Boving | May 18, 1926 |
| 1,650,338 | Fornaca | Nov. 22, 1927 |
| 1,686,071 | Cavalieri | Oct. 2, 1928 |
| 1,895,518 | Peck | Jan. 31, 1933 |
| 1,941,348 | Hathorn | Dec. 26, 1933 |
| 2,024,274 | Campini | Dec. 17, 1935 |
| 2,039,924 | O'Connor | May 5, 1936 |
| 2,109,238 | Sessions | Feb. 22, 1938 |
| 2,147,536 | Levy | Feb. 14, 1939 |
| 2,215,003 | Johnson | Sept. 17, 1940 |
| 2,242,147 | Salisbury | May 13, 1941 |
| 2,280,835 | Lysolm | Apr. 28, 1942 |
| 2,352,793 | Lennes | July 4, 1944 |
| 2,372,393 | Ray | Mar. 27, 1945 |
| 2,373,467 | Frakes | Apr. 10, 1945 |
| 2,390,161 | Mercier | Dec. 4, 1945 |
| 2,395,435 | Thompson et al. | Feb. 26, 1946 |
| 2,430,869 | Fulton | Nov. 18, 1947 |
| 2,434,068 | Geisse | Jan. 6, 1948 |

OTHER REFERENCES

Ser. No. 396,458, Richard (A. P. C.), published May 25, 1943.